April 1, 1924.  
J. R. McFALL  
WHEEL  
Filed Jan. 13, 1923  
1,488,507
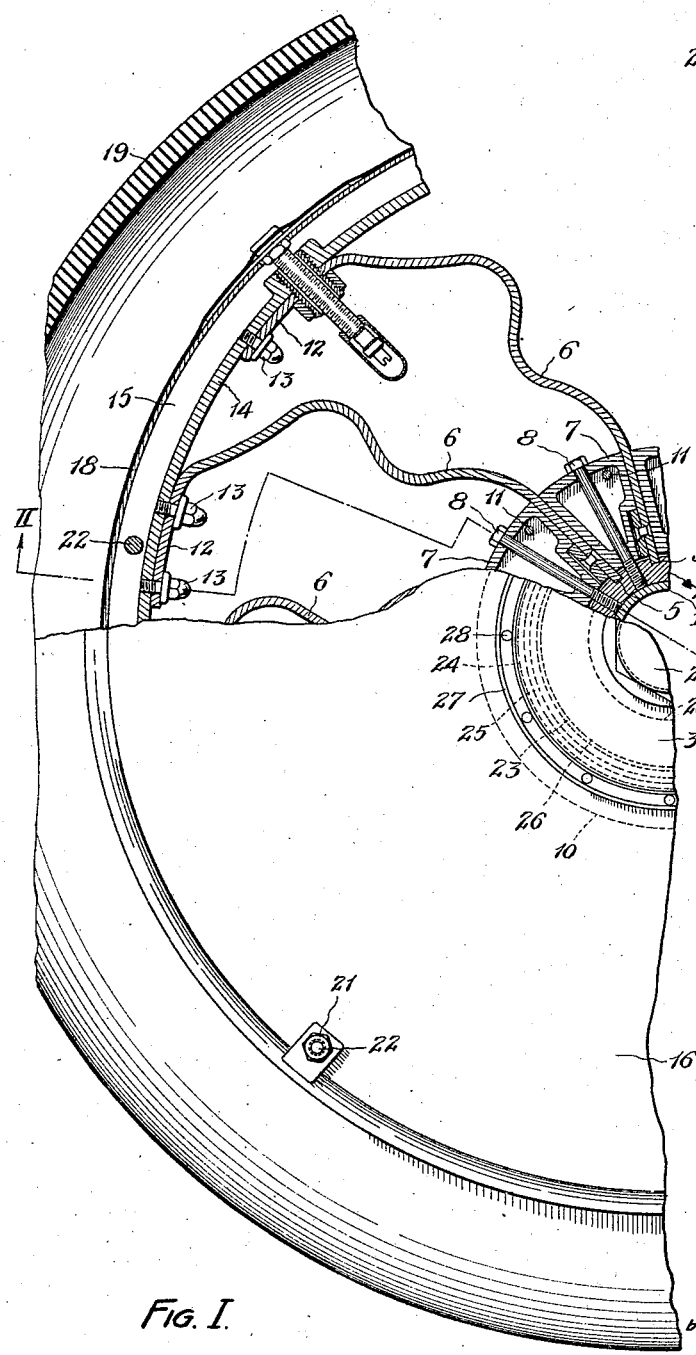
Fig. I.
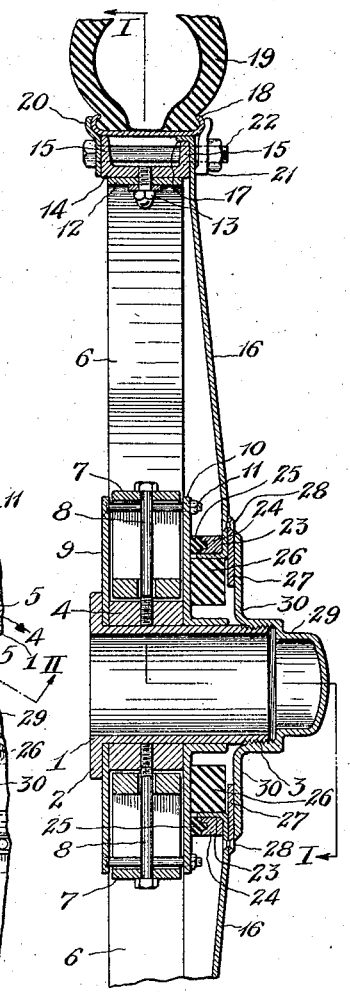
Fig. II.
INVENTOR  
James R. McFall  
by his att'y.

Patented Apr. 1, 1924.

1,488,507

UNITED STATES PATENT OFFICE.

JAMES R. McFALL, OF CLEVELAND, OHIO.

WHEEL.

Application filed January 13, 1923. Serial No. 612,424.

*To all whom it may concern:*

Be it known that I, JAMES R. McFALL, a citizen of the United States, residing at 1643 Walnut St., Suite No. 36, Cleveland, in the State of Ohio and Cuyahoga County, have invented a new and useful Improvement in Wheels, of which the following is a specification, the principle of the invention being herein explained, and the best mode in which I have contemplated applying that principle, so as to distinguish it from other inventions.

My invention relates to a wheel and more particularly to a resilient wheel which in appearance on one side will be of the disk type.

The disclosure of this application may be considered as a modification in respect to certain features of the showing of my Patents No. 1,416,104 issued May 16, 1922 and No. 1,432,884 issued October 24, 1922.

Specific objects of my present invention are:

To supply a wheel having resilient spokes with a disk so connected with the rim and hub as to permit of a relative movement between the rim and hub which will be noiseless in its action. A further object is to provide a disk with an annular flange at both of its ends for partly effecting its connection and for reenforcing the connection both with the rim and elsewhere. Another object is the provision of a disk, in association with a resilient wheel, adapted to share in the strain of the encountered stresses and in any excessive loads. A further object has been to design a structure so that the flange at the nave end of the disk is doubly cushioned and so that the central portion of the disk which is movable relatively to the hub is protected against wear by the interpositioning of a replaceable shield. I also arrange to limit the movement of the nave end of the disk in a direction parallel with the axis.

Adverting to the drawing:

Figure I is a broken side elevation of a sector of a resilient wheel embodying my invention.

Figure II is a mainly radial section of the wheel shown in Figure I.

A hub 1 is fashioned at one end with an annular flange 2 and at its opposite edge with screw threads 3. Surrounding the hub is a collar 4 fashioned with circumferentially arranged recesses 5 for the reception of the nave ends of peculiarly bent resilient spokes 6. Between adjacent pairs of the nave ends of the spokes 6 are anchor blocks 7 secured to the collar 4 by means of cap screws 8. Clamping opposite sides of the spokes 6 and anchor blocks 7 are a pair of annular plates 9 and 10, the former of which abuts the flange 2, and the drawing together of the plates 9 and 10 is accomplished by means of bolts 11 which extend in directions parallel with the axis of the wheel.

The outer ends of the spoke 6 are each bent to form terminal shoes 12 which conform and are secured by means of cap screws 13 to the inner side of a felly 14 which has a pair of annular flanges 15 projecting from opposite ends of the felly in a direction away from the wheel center.

One feature of my present invention is the provision of an annular reenforcing disc 16 which is applied to the outer side of the wheel and extends between the hub and felly so that it will, in conjunction with other parts to be presently referred to, conceal the spoke 6 viewed from one side of the wheel. The outer edge of the disc 16 is inwardly flanged at 17 to abut one of the flanges 15 and become interlocked therewith in association with a demountable rim construction comprising a rim 18 adapted to carry a tire 19 and to be held in place by clamps 20 and 21 to be drawn together by bolt and nut combinations 22; the bolts of which pass through the flanges 15 through the disc 16 and through the clamps 20 and 21. As will be evident upon inspection of Figure II, the outer edge of the disc 16 is thus firmly held against movement in any direction.

As the disc 16 proceeds toward the center of the wheel it extends at a slight angle with respect to the radial plane of the wheel as shown. The inner or nave edge of the disc 16 is likewise provided with an annular flange 23 which projects in the same direction as does the flange 17 and the flange 23 is somewhat wider than the flange 17. Surrounding and abutting the flange 23 at its side which is remote from the center of the wheel is a buffer construction including a ring 24 having in dove tail connection with it a rubber ring 25. The two rings 24 and 25 are adapted for fitting between the disc 16 and the plate 10 so that the rubber ring 25 abuts the latter and serves the function of a cushion for easing the movement of the plate 10 and disc 16 relatively to each other.

Another annular cushion 26, preferably of rubber is interposed laterally between the plate 10 and a wearing ring 27 which depends from the disc 16 to which it is riveted at 28. The cushion 26 is radially interposed between the flange 23 and the hub, a little clearness being afforded around the latter as is clearly shown in Figure II. Detachably connected with the threads 3 is a hub cap 29 fashioned with a flange 30 designed exteriorly to abut the wearing ring 27 which latter is permitted to have sliding frictional engagement therewith while the flange 30 will exclude dust and grit.

In operation, the deflection of the spokes 6 under load will cause the nave end of the disc 16, together with the parts carried thereby, to move relatively to the hub within the confine prescribed by the plate 10 and hub flange 30. Any tendency of the nave end of the disc structure to vibrate or move in a direction parallel with the axis of the wheel will be eased either by the engagement of the rubber ring 25 with the plate 10 or by the engagement of the annular cushion 26 with the wearing ring 27. The radial action or movement of the nave edge of the disc 16 toward and away from the hub will be free, excepting for slight lateral friction, within the limits afforded by the space inside of the cushion. Under excessive load or when an unusual jolt is encountered the inner annular surface will come into engagement with the hub conforming flange on the plate 10 and thereby dissipate shock. Manifestly, the employment of the disc 16 will lend a neat and trim outside appearance to the wheel, but more essentially will act to reenforce the spokes, indeed, the entire wheel construction, by sharing in the wrenches and lateral strains and will accomplish this desired result with a progressive and yielding restraint.

I claim:—

1. A wheel comprising the combination of a hub structure, a rim structure, resilient spokes connecting said hub and rim and an auxiliary connecting structure including flanges having their concave and convex surfaces enclosed and abutted by said rim and hub structures respectively.

2. A wheel comprising the combination of a hub structure, a rim structure, resilient spokes yieldingly connecting said hub and rim a plate at the nave ends of said spokes an annular disc on one side of said spokes, said disc being fashioned with peripheral flanges projecting in the same general direction and confined by said rim and hub structures respectively, and a cushioning device for restraining the approach of said disc toward said plate.

3. A wheel comprising in combination, a hub, a composite rim structure, spokes connecting said hub and rim structure, and a disc fashioned with a peripheral flange wedged radially and secured between parts of said rim structure.

4. A wheel comprising in combination, a hub, a hub plate, a composite rim structure, resilient spokes connecting said hub and rim structure, an annular disc attached to said rim structure and having its smaller edge of angular cross section and spaced both from said hub and from said plate, and cushioning means confined by said hub, plate and angular disc edge for limiting the movement of the central portion of said disc.

5. A wheel comprising in combination, a flanged hub, a rim structure, resilient spokes connecting said hub and rim structure, an annular disc attached to said rim structure and having its smaller edge spaced both from said hub and from its flange, and cushioning means for limiting the movement of the central portion of said disc in a direction parallel with the wheel axis.

6. A wheel comprising in combination, a flanged hub, a composite rim structure, resilient spokes connecting said hub and rim structure, an annular disc attached to said rim structure and having its smaller edge spaced from said hub, yielding means for limiting the movement of the central portion of said disc in one axial direction and means for positively preventing movement of such central portion in the opposite axial direction.

7. A wheel comprising the combination of a rim, a hub, inherently resilient spokes fixed to said rim and hub, an annular disc secured to said rim and having a movable central portion, and a wearing ring carried by said central portion.

8. A wheel comprising the combination of a rim, resilient spokes and a hub structure having spoke nave-end confining flanges, an annular disc secured to said rim and having a movable central portion, a wearing ring carried by said central portion and projecting beyond the same toward the wheel center and a cushion between one of said hub flanges and ring.

9. A wheel comprising the combination of a rim, resilient spokes and a hub structure having spoke nave-end confining flanges, an annular disc having its nave section flanged, said disc being secured to said rim and having a movable central portion, a wearing ring carried by said central portion and projecting beyond the same toward the wheel center and a cushion confined between one of said hub flanges and said ring and also confined between said hub proper and said disc flange.

10. A wheel comprising the combination of a rim, resilient spokes and a hub structure having a spoke nave-end confining flange, an annular disc having its nave section flanged, said disc being secured to said rim and having a movable central portion, a cushion confined between said hub flange and disc to restrain axial movement and another cushion confined between said hub proper and said disc flange to restrain radial movement on the part of said disc.

11. A wheel comprising the combination of a rim, inherently resilient spokes and a hub, an annular disc secured to said rim and having a movable central portion, a hub cap, and a wearing ring carried by said central portion and adapted to rub against and be guided by said hub cap.

12. A wheel comprising in combination, a flanged hub structure, a composite rim structure, resilient spokes connecting said hub and rim structure, an annular disc attached to said rim structure and having its smaller edge of angular cross section and spaced from said hub structure, and cushioning means for limiting the movement of the central portion of said disc both toward and along the wheel axis.

13. A wheel comprising a hub, a rim, resilient spokes connecting said hub and rim, an annular plate secured to the nave ends of said spokes, a disc attached to said rim and adapted perceptibly to move relatively to said hub, the nave portion of said disc being fashioned with an annular flange and cushions on opposite sides of said flange and adapted to bear against said plate.

14. A wheel comprising the combination of a rim, resilient spokes and a hub structure, an annular disc, said disc being secured to said rim and having a movable central portion, a cushion confined between said hub structure and disc to restrain axial movement and another cushion confined between said hub proper and the nave end of said disc to restrain radial movement on the part of the latter.

Signed by me, this 27th day of December, 1922.

JAMES R. McFALL.